United States Patent [19]
Fukai et al.

[11] 3,979,319
[45] Sept. 7, 1976

[54] LIQUID CRYSTAL COMPOSITION

[75] Inventors: Masakazu Fukai, Nishinomiya; Komei Asai, Hirakata; Seiichi Nagata, Sakai; Hiroshi Tatsuta, Katano; Koshiro Mori, Nara, all of Japan

[73] Assignee: Matsushita Electric Industrial Co., Ltd., Osaka, Japan

[22] Filed: Apr. 4, 1973

[21] Appl. No.: 347,632

[30] Foreign Application Priority Data

| Apr. 5, 1972 | Japan | 47-34764 |
|---|---|---|
| Apr. 5, 1972 | Japan | 47-34765 |
| Apr. 5, 1972 | Japan | 47-34766 |
| Apr. 5, 1972 | Japan | 47-34767 |
| Apr. 5, 1972 | Japan | 47-34768 |
| Apr. 5, 1972 | Japan | 47-34769 |
| Apr. 5, 1972 | Japan | 47-34770 |

[52] U.S. Cl. .......................... 252/299; 23/230 LC; 252/408; 350/160 LC
[51] Int. Cl.² .................................. C09K 3/34
[58] Field of Search .................. 252/408, 299; 23/230 LC; 350/160 LC

[56] References Cited
UNITED STATES PATENTS

| 3,551,026 | 12/1970 | Heilmeier | 252/299 X |
|---|---|---|---|
| 3,679,290 | 7/1972 | Adams et al. | 350/157 |
| 3,772,209 | 11/1973 | Batesky | 252/408 |
| 3,803,050 | 4/1974 | Haas et al. | 252/408 |
| 3,827,780 | 8/1974 | Labes | 252/408 X |
| 3,838,059 | 9/1974 | Wong | 252/299 |

OTHER PUBLICATIONS

Fieser et al.: Organic Chemistry, Third Edition, Reinhold Publishing Corp., New York, 1956, pp. 656 and 661.

*Primary Examiner*—Richard D. Lovering
*Attorney, Agent, or Firm*—Stevens, Davis, Miller & Mosher

[57] ABSTRACT

A liquid crystal composition comprises a liquid crystal and a carboxylic acid or its ester as an additive. By the presence of the additive, the longitudinal axes of liquid crystal molecules can be spontaneously oriented in a direction perpendicular to the surface of a holding wall of a liquid crystal display plate. In particular, the additives may be esters of p-hydroxy- or m-hydroxybenzoic acid, phenylacetic acids having 1 or 2 hydroxy groups or their esters, phenylpropionic acids having 1 or 2 hydroxy groups or their esters, or 3, 4, 5-trihydroxybenzoic acid esters, or said additives may be selected from the group consisting of compounds having the formulae:

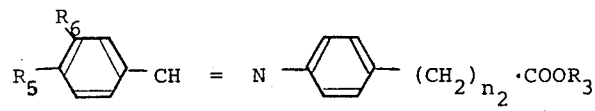

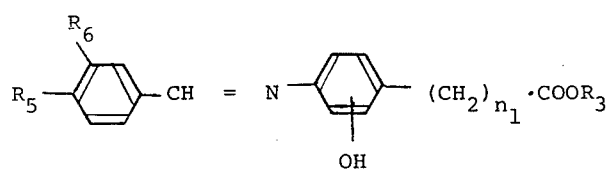

wherein $R_3$ is hydrogen or a normal alkyl group having 1 to 18 carbon atoms; $R_5$ is hydrogen, hydroxy, a normal alkyl group having 1 to 16 carbon atoms or a normal alkoxy group having 1 to 16 carbon atoms; $R_6$ is hydrogen, hydroxy or nitro; $n_1$ is 1 or 2: and $n_2$ is 0, 1 or 2.

2 Claims, 7 Drawing Figures

LIQUID CRYSTAL COMPOSITION

This invention relates to a nematic liquid crystal composition, and more particularly to a nematic liquid crystal composition comprising a liquid crystal, and a carboxylic acid or its ester as an additive, wherein the longitudinal axes of liquid crystal molecules can be spontaneously oriented in a direction perpendicular to the surface of a holding wall of a liquid crystal display plate.

Now, the liquid crystal display plate will be explained by way of the drawings.

FIG. 1 shows a principal structure of a liquid crystal display plate, where

Figure 1A:
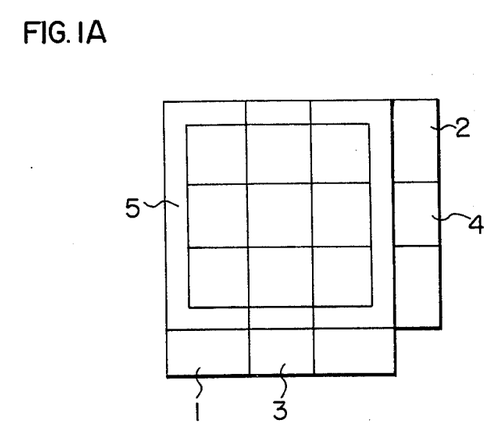
FIG. 1A is a plan view and FIG. 1B is a cross-sectional view.
Figure 1B:
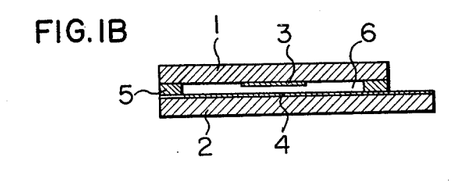

The liquid crystal display plate basically has a structure as shown in FIG. 1. That is, on surfaces of glass substrate plates 1 and 2, there are formed electrodes 3 and 4, respectively. At least one of the electrodes 3 and 4 must be transparent. The glass substrate plates 1 and 2 are held in parallel with each other by means of a spacer 5, and a liquid crystal layer 6 is held between the glass substrate plates 1 and 2.

Usually, the liquid crystal layer is several microns to several ten microns thick, and a thickness of ten and a few microns is mostly widely used for the liquid crystal layer. It is difficult, however, to control axes of liquid crystal molecules in one direction within a relatively wide area of several square millimeters to several square centimeters, when a liquid crystal, which is pure in the so-called chemical concept, that is, whose purity is 99 %, or 99.5 % or more, is held between the substrate plates at such a narrow distance.

When a liquid crystal having a very large dielectric anisotropy is used, its molecular axes are oriented in a direction perpendicular to the surface of the holding walls only upon an application of electric field. Therefore, it is never assured that the molecular axes are oriented in one direction in such a liquid crystal upon no application of an electric field or at parts where no electric field is applied. Further, it is reported that the molecular axes of a liquid crystal having a high purity and a water content of 50 ppm or less are spontaneously oriented in a direction perpendicular to electrodes of annealed stannic oxide. However, a special technique is required for reducing the water content to 50 ppm or less, and furthermore, it is very difficult to keep such a low water content.

Furthermore, it is reported that axes of liquid crystal molecules can be oriented in one direction by using the glass substrates prepared by carefully washing annealed glass surfaces, dipping the glass in Caro's acid for about 30 minutes and repeatedly washing the glass surfaces with deionized water. According to said prior art, it is very difficult to treat the surfaces of glass substrates, and such art is not practical.

An object of the present invention is to overcome these drawbacks encountered in the prior art and provide a novel nematic liquid crystal composition.

The present invention is based on a finding of a fact that molecular axes of a nematic liquid crystal can be oriented in a direction perpendicular to wall surfaces of holding substrate plates by adding a special additive to the liquid crystals.

As is well known, the liquid crystal mechanically has a property as a liquid, but optically has an anisotropy at the same time, because the orientation of molecules is uniform in a much broader spatial range than wavelength zone of the light. In the nematic liquid crystal, the direction of main axis of the anisotropic index of refraction is parallel with that of the longitudinal axes of the molecules, and further the index of refraction in a plane perpendicular to the longitudinal axes is constant. Thus, the nematic liquid crystal has a uniaxial optical anisotropy.

Figure 2A:
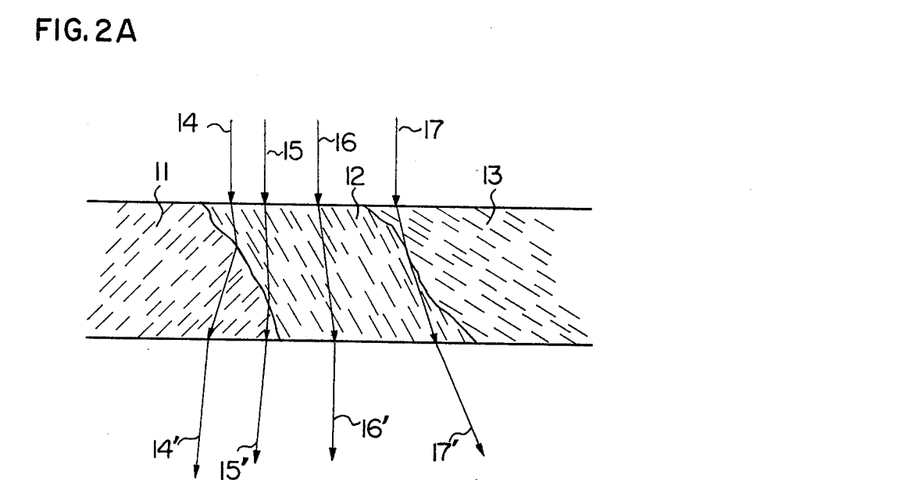
FIG. 2 is schematic views showing light scattering by the orientation state of axes of liquid crystal molecules.

When the molecular axes of the liquid crystals are not oriented in one direction, as shown in FIG. 2A, the index of refraction differs at boundaries between zones 11, 12, and 13, where the different orientation prevails from one to another. Incident light 14–17 is scattered though weakly, and polarization of the incident light partially changes from the zone to zone 11, 12, and 13. Therefore, when a man sees a far background object through such a liquid crystal, the object is seen somewhat dimly and the liquid crystal layer is seen slightly turbidly.

Figure 2B:
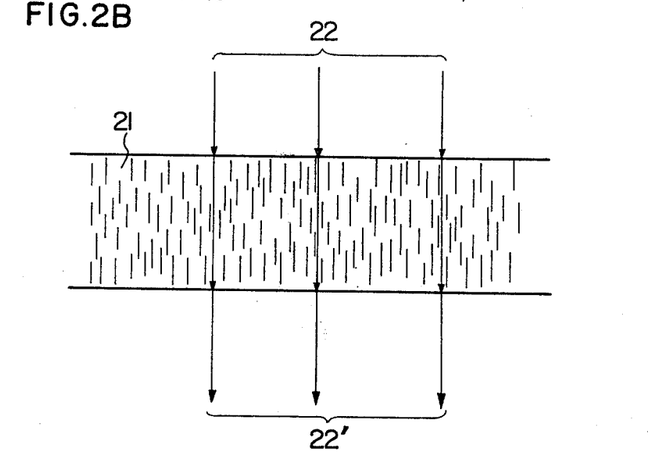

On the other hand, when the molecular axes are all in parallel and the light 22 is incident in parallel with the molecular axes, as shown in FIG. 2B, the incident light goes straight through the liquid crystal layer, and parallel light 22' appears. That is, in that case, the liquid crystal is equivalent with the uniaxial crystal in its property, and the incident light undergoes no scattering or no rotation of polarizing plane, as observed by way of FIG. 2A.

Figure 3:
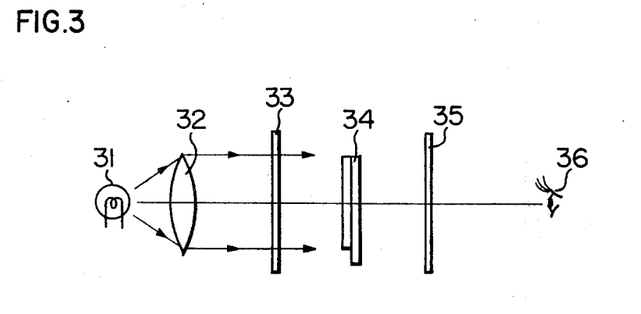
FIGS. 3 and 4 are schematic views showing structures of apparatuses for inspecting and measuring light scattering of liquid crystal composition.

Light scattering of a liquid crystal can be confirmed by an apparatus having a structure as shown in FIG. 3. Light from a light source is made parallel through a lens system 32 and made incident upon a liquid crystal display plate 34 through a polarizer 33. The light passed through the liquid crystal display plate 34 is led to an analyser 35. The observer can see the presence of light scattering of the liquid crystal display plate 34, by arranging the analyser 35 so that its polarizing plane may be at a right angle to that of the polarizer 33. That is, the liquid crystal display plate looks slightly bright to the observer 36, when the liquid crystal display plate 35 is in an orientation as in FIG. 2A, though there is a local difference in brightness or difference in coloring. When the liquid crystal display plate is in an orientation as in FIG. 2B, the plate seems dark to the observer.

According to the present invention, the liquid crystal composition comprises a nematic liquid crystal having a Schiff base group (—CN=N—) or in a in a molecule, and a carboxylic acid or its ester as an additive.

The nematic liquid crystal used in the present invention includes compounds represented by the following general formula:

where $R_1$ and $R_2$ represent $C_nH_{2n+1}$ —$CnH_{2n+1}O$— or functional groups ($1 \leq n \leq 7$), for example.

Carboxylic acid or its ester used as the additive used in the present invention is represented by the following general formula:

$$R_1COOR_2$$

wherein $R_1$ represents an alkyl, aryl or aralkyl group, which can have one or more substituents, and $R_2$ represents a hydrogen atom or normal alkyl group having 1 to 18 carbon atoms.

More particularly, $R_1$ of said carboxylic acid or its ester can be a normal alkyl group having 1 to 19 carbon atoms; aminophenyl group; α-aminophenylalkyl group; hydroxyaminophenyl group; monohydroxyphenyl group; dihydroxyphenyl group; α-monohydroxyphenylalkyl group; α-dihydroxyphenylalkyl group; trihydroxyphenyl group; phenyl, hydroxyphenyl or α-phenylalkyl group having a Schiff base group at 4-position.

The carboxylic acid or its ester used as the additive in the present invention includes:

Fatty acids or their esters, for example, $CH_3COO(CH_2)_7CH_3$ $CH_3COO(CH_2)_{17}CH_3$

$CH_3(CH_2)_7COOH$

$CH_3(CH_2)_{10}COOH$

$CH_3(CH_2)_{10}COO(CH_2)_4CH_3$

$CH_3(CH_2)_{16}COOH$, etc.;

4-Aminobenzoic acid, 4-aminophenylacetic acid, 4-aminophenylpropionic acid, or their esters, or said compounds, at least one of whose hydrogen atoms at 2-, 3-, 5- or 6-position is replaced with a hydroxyl group (—OH), for example,

Benzoic acids, phenylacetic acids or phenylpropionic acids having one or two hydroxyl groups, or their esters, for example,

3,4,5-Trihydroxybenzoic acid esters represented by the general formula:

wherein R represents $C_nH_{2n+1}-$, in which $n$ is preferably an integer of 2 to 18.

Compounds obtained by reaction of one of 4-aminobenzoic acid, 4-aminophenylacetic acid, 4-aminophenylpropionic acid and 4-aminosalicylic acid with a benzaldehyde having one or more hydroxyl groups, or their esters, for example, etc; and

Compounds represented by the following general formula:

wherein *m* is an integer of 1 to 16, and *n* is an integer of 1 or 2, for example, According to the present invention, said compound as the additive is added alone or in a mixture thereof to the liquid crystal in an amount of from 0.1 to 5 % by weight, preferably, from 0.5 to 1.5 % by weight, based on the liquid crystal. The additives can be used alone or in a mixture thereof.

Now, the present invention will be explained by way of examples and the accompanying drawings.

EXAMPLE 1

Two pairs of a liquid crystal mixture consisting of equal moles of the following three compounds was used:

or 0.1 up to 5 % by weight of the following commercially available compounds was added to said liquid crystal mixture, one for each mixture, without any purification based on the weight of the mixture, mixed, and placed in a liquid crystal display plate as shown in FIG. 1.

Figure 4:
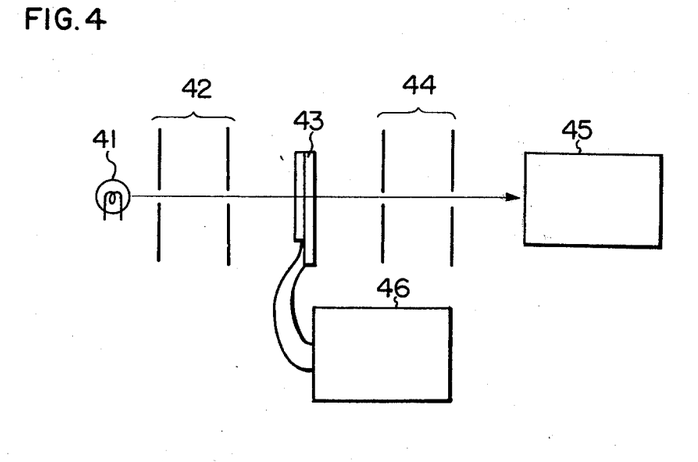

$CH_3COO(CH_2)_7CH_3$ $CH_3COO(CH_2)_{17}CH_3$ $CH_3(CH_2)_7COOH$ $CH_3(CH_2)_{10}COOH$ $CH_3(CH_2)_{10}COO(CH_2)_4CH_3$ and $CH_3(CH_2)_{18}COOH$ The resulting compositions were investigated in apparatuses as shown in FIGS. 3 and 4, as well as a polarizing microscope, and it was found that the orientation of longitudinal axes of the liquid crystal perpendicular to wall surfaces was improved, as compared with the liquid crystal having none of such additives. It was further confirmed that the fatty acid had a better orientation than the fatty acid esters.

In the liquid crystal display plate having a structure as shown in FIG. 1, in which said compositions were employed, there were the following three cases as to the wall surfaces in contact with the liquid crystal composition. The first case was that all the two wall surfaces has parts of transparent, electroconductive films constituting electrodes. The second case was that one of the wall surfaces had a part of transparent, electroconductive film, and other a part of glass plate. The third case were both two wall surfaces had parts of glass plates.

When the additive had a high effect upon the orientation of liquid crystal molecules in a direction perpendicular to the wall surface, a good perpendicular orientation appeared over all the area of the liquid crystal display plate. Thus, there was observed no substantial difference in the effect in said respective parts. When the additive had a low effect upon the orientation in a direction perpendicular to the wall surface, better perpendicular orientation was obtained at the parts of transparent, electroconductive film of the two wall surfaces than other parts. Furthermore, even when the additive had a weaker effect upon the orientation, it was found that a good orientation was obtained at an area of several square millimeter.

In the measurement of light scattering upon an application of voltage to the liquid crystal layer, an optical system as shown in FIG. 4 was used. That is, a light source 41, a light shield plate 42 having a small perforation, a liquid crystal display plate 43 whose substrate surfaces were washed to such a degree as no oil fouling was present, a light shield plate 44 having a small perforation and a light recipient 45 were arranged on a straight line. A variable voltage electric source 46 was connected to the liquid crystal display plate 43, and a voltage was applied to between the transparent electrodes. When the applied voltage was lower than the threshold value of scattering, the light recipient 44 received a maximum light intensity. When the applied voltage reached the threshold value, scattering took place. The scattered light was shielded by the light shield plate 44, and recipient light intensity was reduced. The relation between the applied voltage and recipient light intensity thus obtained is given in FIG. 5.

Figure 5:
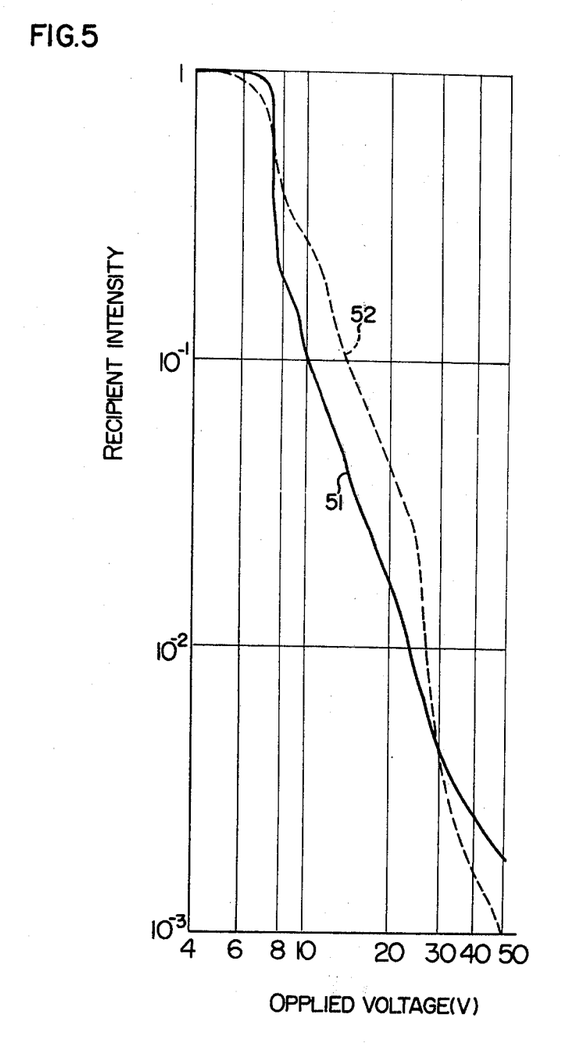
FIG. 5 is a diagram showing comparison of light scattering of the liquid crystal composition containing the additive of the present invention, and that containing no additive.

In FIG. 5, the full line 51 shows a characteristic line typical of the present liquid crystal composition and the dotted line 52 shows that of the liquid crystal containing none of the additive.

As is apparent from FIG. 5, the present liquid crystal composition underwent a large reduction in recipient light intensity in a range from the threshold voltage to 30 volts of the applied voltage.

When the resistivity of the present liquid crystal composition or the present composition containing further additive that failed to break the perpendicular orientation was controlled to about $1 \times 10^8$ to $1 \times 10^{10}$ ohm-cm at room temperature, the light scattering was particularly increased upon an application of voltage of 30 volts or less, as compared with the liquid crystal containing none of the additive. This phenomenon is particularly suitable, in a practical meaning, for direct drive of the liquid crystal display plate, when the driving apparatus is comprised of a MOS type integrated circuit.

When a scattering of the liquid crystal layer upon no application of voltage, that is, residual scattering, was investigated, the following effect was confirmed by adding said additive to the liquid crystal. The investigation was carried out by means of an apparatus basically similar to that shown in FIG. 4, where an axis connecting the light shield plate 44 with the light recipient 45 was inclined by 15° against the axis connecting the light source 41 with the light shield plate 42 and the liquid crystal display plate 43. Incident light intensity upon the light recipient 45 was compared between the liquid crystal display plate 43 ofs substrate distance of 12 microns containing liquid crystals containing none of the additive and the present liquid crystal composition. As a result, it was found that the recipient light intensity of the present compositions was 1/5 to 1/20 times that of the liquid crystal containing none of the additives and it was confirmed that the perpendicular orientation of the molecular axes was improved.

Further, when the similar investigation was carried out with increased thickness of the liquid crystal layer, it was found that the recipient light intensity was increased almost proportional to the thickness in the case of the liquid crystal mixture containing none of the additive, whereas no change was observed in the present liquid crystal composition with the increased in the thickness of the liquid crystal layer almost at all.

EXAMPLE 2

0.1 up to 5 % by weight of the following additives were added to the liquid crystal mixture of Example 1 to prepare a liquid crystals, based on the weight of the liquid crystal mixture, mixed and placed in a liquid crystal display plate as shown in FIG. 1.

(1)

(2)

(3)

(4)

(5)

(6)

(7)

(8)

(9)

(10)

(11)

(12)

(13)

(14)

(15)

(16)

The investigation was carried out in the same manner as in Example 1.

These acids and esters were well dissolved in the liquid crystal mixture, and the resulting composition had a good orientation of liquid crystal molecules in a direction perpendicular to wall surfaces. For example, when 1 % by weight of said additives (1), (11) and (14) were added to the liquid crystal mixture, the resistivity was lowered to about $1 \times 10^{10}$ ohm-cm, and showed a light scattering as shown by 51 in FIG. 5. In the case of the additive (16), the resistivity was considerably lowered, as compared with the above three. In the case of the estherified additives (2) to (10), (12), (13) and (16) alone, the light scattering was slightly lowered, as compared with the characteristic as shown in FIG. 4, but could be increased by using a plurality of the additives.

As to the perpendicular orientation, relation between the applied voltage and recipient light intensity, etc. the same tendencies as in Example 1 were obtained. As to the light scattering upon no application of voltage, the recipient light intensity of the present compositions was 1/15 to 1/20 times that of the liquid crystal mixture containing none of the additive.

EXAMPLE 3

0.1 up to 5 % by weight of the following additives were added to the liquid crystal mixture of Example 1 to prepare liquid crystal compositions, based on the weight of the liquid crystal mixture, mixed, and placed in a liquid crystal display plate as shown in FIG. 1.

(1) HO—⟨C6H4⟩—COOH (2) HO—⟨C6H4⟩—COO(CH$_2$)$_3$CH$_3$ (3) HO—⟨C6H4⟩—COO(CH$_2$)$_6$CH$_3$ (4) HO—⟨C6H4⟩—COO(CH$_2$)$_7$CH$_3$ (5) HO—⟨C6H4⟩—COO(CH$_2$)$_{11}$CH$_3$ (6) HO—⟨C6H4⟩—COOH (7) HO—⟨C6H4⟩—CH$_2$COOH (8) (OH, HO)—⟨C6H3⟩—CH$_2$COOH (9) (HO, HO)—⟨C6H3⟩—CH$_2$·CH$_2$·COOH (10) HO—⟨C6H4⟩—CH$_2$·CH$_2$·COOH

The investigation was carried out in the same manner as in Example 1.

When these additives were added to the liquid crystal mixture, spontaneous orientation was improved, and the liquid crystal molecules were oriented in a direction perpendicular to the wall surfaces. It was found that the additives in acid form were added, the additives of high melting point were hard to dissolve even by heating, and some of these additives failed to add in excess of substantially 1 %, but the orientation effect was observed with a very small amount of the additive in that case. The perpendicular orientation was considerably improved with longer alkyl chain and more hydroxyl groups in the case of esters. Further, to control the resistivity of the liquid crystal composition, the additive with more hydroxyl groups was preferable, and had a higher effect upon decrease in the resistivity per unit weight of the additive added.

As to the perpendicular orientation, relation between the applied voltage and recipient light intensity, etc. The same tendencies as in Example 1 were obtained.

As to the light scattering upon no application of voltage, the recipient light intensity of the present composition was 1/7 to ⅛ times that of the liquid crystal mixture containing none of the additive.

EXAMPLE 4

0.1 up to 5 % by weight of the following additives were added to the liquid crystal mixture of Example 1, based on the weight of the liquid crystal mixture to prepare liquid crystal compositions, mixed and placed in a liquid crystal display plate as shown in FIG. 1.

(1) (HO, HO, HO)—⟨C6H2⟩—COOC$_2$H$_5$

(2) (HO, HO, HO)—⟨C6H2⟩—COOC$_6$H$_{13}$

(3) (HO, HO, HO)—⟨C6H2⟩—COOC$_7$H$_{15}$

(4) (HO, HO, HO)—⟨C6H2⟩—COOC$_8$H$_{17}$

(5) (HO, HO, HO)—⟨C6H2⟩—COOC$_9$H$_{19}$

(6) (HO, HO, HO)—⟨C6H2⟩—COOC$_{10}$H$_{21}$

(7)

(8)

(9)

(10)

(11)

(12)

(13)

(14)

The investigation was carried out in the same manner as in Example 1.

It was found that the perpendicular orientation was better with the esters of longer alkyl chain than those of the shorter ones. For example, those with $C_{12}H_{25}$, $C_{16}H_{33}$ and $C_{18}H_{37}$ alkyl chains had no particular difference in the perpendicular orientation and showed an almost complete orientation, irrespective of the kind of the wall surface, that is, glass surface or transparent electroconductive film. Ester with $C_{12}H_{25}$ alkyl chain had a good orientation even if the thickness of the liquid crystal layer was changed up to about 100 microns. Even with the metal evaporation-deposited wall surface, a good orientation was obtained.

As to the perpendicular orientation, relation between the applied voltage and recipient light intensity, etc., the same tendency as in Example 1 were obtained.

As to the light scattering upon no application of voltage, the recipient light intensity of the present composition was 1/15 to 1/20 times that of the liquid crystal mixture containing none of the additive.

EXAMPLE 5

0.1 up to 5 % by weight of the following additives were added to the liquid crystal mixture of Example 1, based on the weight of the liquid crystal mixture, to prepare liquid crystal compositions, mixed and placed in a liquid crystal display plate as shown in FIG. 1.

(1)

(2)

(3)

(4)

(5)

(6)

(7)

(8)

(9)

(10)

(11)

(12)

(13)

The additive (1) was prepared by dissolving equal moles of p-hydroxybenzaldehyde and 4-aminobenzoic acid in benzene and refluxed with heating to effect formation of Schiff linkage (—CH = N—). Other remaining additives were likewise prepared from the corresponding aldehydes and amines.

The investigation was carried out in the same manner as in Example 1.

All of these additives brought about perpendicular orientation of liquid crystal molecules, and it was observed that the additives (4), (6) and (7) having a hydroxy group at 2-position of benzene ring with respect to the Schiff group at the center turned yellow when added to the liquid crystal mixture. Further, it was confirmed that the additive having more hydroxyl groups such as the additive (7) was hard to dissolve in the liquid crystal mixture, as compared with other additives.

As to the perpendicular orientation, relation between the applied voltage and recipient light intensity, etc., the same tendency as in Example 1 were obtained.

As to the light scattering upon no application of voltage, the recipient light intensity of the present composition was 1/10 to 1/20 times that of the liquid crystal mixture containing none of the additive.

EXAMPLE 6

0.1 up to 5 % by weight of the following additives were added to the liquid crystal mixture of Example 1, based on the weight of the liquid crystal mixture, to prepared liquid crystal compositions, mixed and placed in a liquid crystal display plate as shown in FIG. 1.

(1)

(2)

(3)

(4)

(5)

The additive (1) was prepared by adding an excess amount of dodecyl alcohol to 4-aminobenzoic acid, introducing dried hydrogen chloride gas thereto while refluxing in benzene, then refluxing equal moles of p-hydroxybenzaldehyde and the resulting 4-aminobenzoic acid dodecyl ester while refluxing in benzene, thereby effecting dehydration reaction of the aldehyde and amine to form a Schiff base group (—CH = N—). Other additives were likewise synthesized.

The investigation was carried out in the same manner as in Example 1.

These additives had a remarkable perpendicular orientation, when added to the liquid crystal mixture, and their effect as the additive was recognized. However, said additive (3) was relatively hard to dissolve in the liquid crystal mixture, as compared with other additives, and remained as solid, when it was added to the liquid crystal mixture in excess of 1 % by weight, and heated. Therefore, the substantial amount of the additive (3) to be added was smaller than those of other additive, and its effect upon the perpendicular orientation was somewhat lower than the other additives.

As to the perpendicular orientation, relation between the applied voltage and recipient light intensity, the same tendency as in Example 1 were observed.

As to the light scattering upon no application of voltage, the recipient light intensity of the present composi- tion was 1/10 to 1/20 times that of liquid crystal mixture containing none of the additive.

EXAMPLE 7

0.1 up to 5 % by weight of the following additives were added to the liquid crystal mixture of Example 1, based on the weight of the liquid crystal mixture, to prepare liquid crystal compositions, mixed and placed in as liquid crystal display plate as shown in FIG. 1.

(1)

(2)

(3)

(4)

(5)

(6)

(7)

(8)

(9)

(10)

(11)

(12)

(13)

(14)

(15)

(16)

(17)

(18)

(19)

(20)

(21)

(22)

(23)

(24)

(25)

(26)

(27)

(28)

The investigation was carried out in the same manner as in Example 1.

When these additives were added to the liquid crystal mixture, a strong perpendicular orientation appeared. The additives having the hydroxyl group were effective not only in establishing the perpendicular orientation, but also in lowering the resistivity of the liquid crystal composition. For example, when 1 % by weight of such additives were added to the liquid crystal mixture the resistivity of the liquid crystal composition was reduced from $10^{11}$ ohm-cm to about $10^8$ ohm-cm.

When 1 % by weight of the additive (3) was added to the liquid crystal mixture, the resistivity was $4 \times 10^{10}$ ohm-cm at room temperature, but even at such a large resistivity, a typical scattering characteristic by addition of such additive was confirmed. It was also confirmed that such characteristics appeared likewise with other additives than those having the hydroxy group.

As to the perpendicular orientation, relation between the applied voltage and recipient light intensity, the same tendency as in Example 1 were observed.

As to the light scattering upon no application of voltage, the recipient light intensity of the present composition was 1/10 to 1/20 times that of liquid crystal mixture containing none of the additive.

In addition, it is pointed out that, when said additives as mentioned in the foregoing Examples are added to a liquid crystal, in which a longitudinal direction component of low frequency dielectric constant of liquid crystal molecules has a low negative dielectric anisotropy, as compared with the vertical direction component, an optical apparatus based on a different principle of function than that of the dynamic scattering mode can be formed. That is to say, when a liquid crystal having the negative dielectric anisotropy is given a perpendicular orientation, the molecules are oriented in a direction perpendicular to the wall surface upon no application of voltage. The orientation of molecules can be shifted to such an orientation that the axes of the molecules are in parallel with the wall surface, by applying a low frequency A.C. voltage under several 10 kHz, while controlling the light scattering by the dynamic scattering mode. Since the polarizing plane of light incident upon the liquid crystal layer undergoes rotation, only parts, to which the voltage is applied, look bright in the apparatus as shown in FIG. 3, and when other parts look dark. By utilizing such phenomena, not only the display apparatus, but also new optical apparatuses utilizing the liquid crystal can be provided.

The present invention can be applied not only to the liquid crystals as mentioned before, but also to other liquid crystals, so long as they will not react with the additives used in the present invention.

What is claimed is:

1. A liquid crystal composition consisting essentially of a nematic liquid crystal compound selected from the group consisting of compounds of the formula, and wherein $R_1$ and $R_2$ represent $C_nH_{2n+1}-$, $C_nH_{2n+1}O-$ or functional group ($1 \leq n \leq 7$) or mixture thereof and 0.1% to 5% by weight, based on said liquid crystal compounds, of at least one additive compound selected from the group consisting of compounds of the formula,

(1)

(2)

(3)

(4)

(5)

(6)

and (7)

wherein $R_3$ is selected from the group consisting of hydrogen and a normal alkyl group having 1 to 18 carbon atoms; $R_4$ is a normal alkyl group having 1 to 18 carbon atoms; $R_5$ is selected from the group consisting of hydrogen, hydroxy, a normal alkyl group having 1 to 16 carbon atoms and a normal alkoxy group having 1 to 16 atoms; $R_6$ is selected from the group consisting of hydrogen, hydroxy and nitro; $n_1$ is for 1 or 2 and $n_2$ is 0, 1 or 2.

2. A liquid crystal display system using a liquid crystal composition of claim 1.

* * * * *